Patented Dec. 11, 1951

2,578,270

UNITED STATES PATENT OFFICE 2,578,270

STABLE CHLORINATED MELAMINE COMPOSITION

Franklin Strain, Norton Center, Ohio, assignor to Pittsburgh Plate Glass Company, Allegheny County, Pa., a corporation of Pennsylvania No Drawing. Application September 23, 1949, Serial No. 117,497

3 Claims. (Cl. 252—187)

This invention relates to certain chlorinated derivatives of cyanuric acid and to methods of producing these compounds, and is particularly directed to the reaction products obtained by mixing a highly chlorinated melamine with melamine.

The chlorination of certain organic compounds to yield products having sufficient active or available chlorine to be capable of use in bleaching and sterilizing processes is well known. Such products must be sufficiently soluble in water so that an adequate amount of active chlorine will be readily available. Futhermore, aqueous solutions of the product should not lose excessive amounts of available chlorine when employed in bleaching, sterilizing and other similar operations.

The term "available chlorine" is a term used to indicate the oxidizing activity of a chlorine containing compound. It is by definition, the same weight as that of gaseous or liquid chlorine that would exert the same action as the chlorine compound in queston. For example, in the case of bleaching powder, $CaOCl_2$, the available chlorine is the same as the percentage of chlorine, but in the case of calcium hydrochlorite, $Ca(OCl)_2$, the available chlorine is twice the percentage (49.6 percent by weight) of chlorine in $Ca(OCl)_2$ or 99.2 percent. This is another way of saying that one mole of $Cl_2$ is equivalent in oxidizing power to one mole of HOCl or to the ion $OCl^-$ wherein the chlorine is positively charged. Bleaching powder, $CaOCl_2$, by this convention contains about 35 or less percent of available chlorine. The available chlorine concept may be further explained by the reactions:

For calcium hypochlorite $$Ca(OCl) \rightarrow Ca^{++} + 2OCl^-$$

For bleaching powder $$CaOCl_2 \rightarrow Ca^{++} + OCl^- + Cl^-$$

For chlorine $$Cl_2 + H_2O \rightarrow HOCl + HCl$$

$$HOCl \rightleftharpoons H^+ + OCl^-$$

One mole of calcium hypochlorite will furnish twice the amount of $OCl^-$ ions as one mole of chlorine or bleaching powder, and consequently twice the amount of available chlorine since all of its chlorine is present as positive or oxidizing chlorine.

In recent years several United States patents relating to the halogenation of certain cyanuric acid derivatives have been issued. U. S. Patents 2,184,883, 2,184,886 and 2,184,888 specifically relate to the halogenation of melamine, dicyandiamide, and the amides and imides of cyanuric acid. In the first of these patents it is reported that solid products containing from 40% to as high as 127% of available chlorine may be prepared. The chlorination of melamine apparently produces mixtures containing N-chloro derivatives wherein one or more hydrogen atoms in the melamine molecule are replaced by chlorine atoms. Because of the high content of available chlorine, marked stability in solid state, and other properties, it has been found preferable to manufacture for sale, the highly chlorinated melamines such as those which have an available chlorine content above about 100%. These products are stable and slightly soluble in water and when added to water provide a limited amount of active chlorine for bleaching and related purposes.

Because of their slight solubility, when chlorinated melamines are dissolved in water it is conventional to refer to the available chlorine of the solution as present in parts per million as well as percent available chlorine. For example, as stated above, a highly chlorinated melamine containing about 125 percent available chlorine can be produced. This means that theoretically one gram of the highly chlorinated melamine contains 1.25 grams of available chlorine. Thus when 20 milligrams of this highly chlorinated melamine is dissolved in 100 grams of water, the available chlorine content of the solution is approximately 0.0025 parts per hundred or 25 parts per million.

Solubility data in water for a chlorinated melamine containing 127 percent available chlorine indicate that a solution containing about 40 to 50 parts per million available chlorine exists in equilibrium with the highly chlorinated melamines. Frequently it is desirable, however, when aqueous chlorinated melamine solutions are employed for bleaching, sterilizing etc., that they contain available chlorine considerably in excess of a saturated aqueous solution of 40 to 50 P. P. M.

Solutions containing over 50 P. P. M. of available chlorine may be prepared by dissolving certain alkaline agents with the chlorinated melamines. I have found that moderately alkaline materials such as sodium carbonate and sodium bicarbonate increase the water solubility of the highly chlorinated melamines and thereby provide increased concentrations of available chlorine, but the solutions thereof are unstable and the available chlorine is dissipated fairly rapidly from these aqueous solutions in a few hours.

Solutions containing as much as 10,000 P. P. M. available chlorine can be prepared by adding alkaline materials such as to constitute the pH of the alkaline solution equal to or greater than 10. Borax and sodium bicarbonate thus cannot be used to produce a solution of a chlorinated melamine containing 10,000 P. P. M. of available chlorine whereas sodium carbonate can be used. The more alkaline compounds such as alkali-metal or alkaline earth metal hydroxides, many of the phosphates, silicates, etc. are satisfactory for solubilizing the chlorinated melamine to this extent. These high pH solutions of highly chlorinated melamine and, for example, caustic soda are relatively unstable, losing as much as 10% of their available chlorine in four hours at room temperature.

Whereas as just shown highly chlorinated melamine can be dissolved with certain alkaline compounds and upon standing for four hours lose approximately ten percent of the available chlorine in the freshly prepared solution, the loss of available chlorine from a 1% calcium hypochlorite solution in a comparable period of time is so slight that it cannot be detected by the usual analytical methods. Highly chlorinated melamines have not been found suitable, therefore, in processes which require from one hundred or several hundred to ten thousand P. P. M. of available chlorine in solution because excessive amounts of strongly alkaline compounds are necessary to get the chlorine compounds into solution and the stability of those solutions is not good.

In accordance with my invention, I have discovered that the addition of sufficient amounts of melamine to a highly chlorinated melamine containing above 100 percent available chlorine (based upon the combined weight of melamine and chlorinated melamine) produces compositions which when added to aqueous alkaline solutions yield stable solutions containing upwards of 100 parts per million of available chlorine. These new compositions are more soluble in aqueous alkaline solutions than the pure chlorinated melamine, and the available chlorine content of their aqueous alkaline solutions can be maintained at reasonably high levels over extended periods of time. The effect of the addition of the melamine to the chlorinated melamine is to render aqueous alkaline solutions of the chlorinated melamine considerably more stable.

In the practice of the invention, good results are obtained when sufficient melamine is added to a highly chlorinated melamine containing in excess of 100 percent available chlorine, to constitute the available chlorine content of the mixture of melamine and chlorinated melamine at between 25 and 75 percent. For example, when melamine is added to a highly chlorinated melamine containing approximately 125 percent available chlorine, enough melamine is added so that the available chlorine content of the mixture will be below approximately 75 percent by weight and above approximately 25 percent by weight. The weight ratio of the highly chlorinated melamine to melamine employed to attain the above available chlorine contents varies from approximately 4 to 1 to 1 to 2. When such mixtures are then added to an alkaline aqueous solution, resulting stable solutions can be obtained containing upwards of 100 P. P. M. available chlorine, depending upon the pH of the alkaline solution.

In addition to adding the melamine-chlorinated melamine composition to aqueous alkaline solutions, melamine-chlorinated melamine compositions may be intimately mixed in the dry state, or they may be compounded in the presence of small amounts of water to form a paste or slurry before being employed in an aqueous solution. These compositions may be mixed with causticized ash, soda ash, sodium bicarbonate, sodium metasilicate, borax, or sodium phosphates including the molecularly dehydrated phosphates which are capable of forming water-soluble complexes with dissolved calcium and magnesium. Mixtures of melamine, a highly chlorinated melamine, soda ash and phosphates such as the meta-, tetra- or pyro- phosphates are particularly useful in preparing clear stable bleaching solutions in waters which are high in calcium and magnesium. The melamine-chlorinated melamine compositions may be compounded with any of the commonly used alkaline, alkali-metal or alkaline earth compounds depending upon the particular application for which they are to be used.

A comparison between the stability of aqueous solutions of mixtures of an alkaline material and a chlorinated melamine containing approximately 127 percent available chlorine, with and without added melamine, indicates that the presence of melamine definitely reduces the loss of available chlorine from solution. To make the comparison, the dry mixtures illustrated in Table I were prepared.

TABLE I

*Composition per cent by weight*

| Sample No. | $Na_2CO_3$ | $NaHCO_3$ | $Na_3PO_4$ | Chlorinated Melamine (Available chlorine 127%) | Melamine |
|---|---|---|---|---|---|
| 1 | 83.93 | | | 11.65 | 4.42 |
| 2 | | 83.93 | | 11.65 | 4.42 |
| 3 | | | 83.93 | 11.65 | 4.42 |
| 4 | 88.3 | | | 11.65 | |
| 5 | | | 88.3 | 11.65 | |

Sufficient quantities of each sample were dissolved in water to yield solutions containing 10,000 P. P. M. available chlorine and tests were made after four hours to determine the percent of loss of available chlorine. Solutions were maintained at room temperature throughout the test period. Percentage loss of available chlorine from the five samples was approximately 2.7%, 5.3%, 5.1%, 70.0% and 20.0% respectively. It is obvious that the presence of melamine effectively reduces the loss of available chlorine.

Solubility and stability determinations were made by dissolving specially-prepared granules which were approximately $\frac{1}{16}$ inch in diameter. These were prepared by thoroughly mixing melamine and a highly chlorinated melamine in various ratios. The mix was compressed into pellets approximately $\frac{3}{8}$ inch by $\frac{3}{16}$ inch in size and these were crushed to obtain the granules. All fines passing a 40 mesh screen were discarded. When granules having a chlorinated-melamine to melamine mole ratio of 1:1 were placed in an aqueous alkaline solution at 10° C., a maximum available chlorine value of about 570 P. P. M. was attained after approximately 5 hours. Pellets of the same composition provided a maximum of about 720 P. P. M. after 35 hours at the same temperature.

Since the larger particle sizes of the melamine-chlorinated melamine mixtures dissolve more slowly, any of the mixtures may be compressed into briquettes or other forms where an even slower rate of solution is indicated. For example, in certain sterilizing operations such as the cleansing of soda fountain or bar glassware, eating utensils or other objects, a tablet, pellet or briquette of a certain size and shape could be placed in the proper watertank so that a gradual dissolution would occur as the available chlorine was dissipated. In some cases the solid form could be placed in a dispensing device and water could be flowed over it in a continuous stream at a predetermined rate.

While the melamine-chlorinated melamine mixtures may be used per se as bleaching, sterilizing and germicidal agents in aqueous alkaline solutions, very desirable products may be prepared by dry or wet mixing of dispersions of these materials with one or more detergent compositions such as soaps, phosphated or sulfated alcohols such as the sulfates and phosphates of primary or secondary aliphatic alcohols such as octyl, lauryl, oleyl, or hexyl alcohol; alkali metal phosphates including the molecularly dehydrated phosphates; organic sulfonic acids or salts thereof such as Turkey red oil, isopropyl naphthalene, sodium sulfonate, etc.; alkali metal carbonates, silicates, etc. In addition, the melamine-chlorinated melamine compositions may be mixed with other bleaching or sterilizing agents such as hypochlorites. Other mixtures thereof will be obvious to those skilled in the art.

In a similar manner, I have found that derivatives of ammeline or ammelide, such as the sodium, potassium, calcium and barium or other alkali-metal or alkaline earth salts thereof, or organic or amino- or cyano- organic derivatives thereof, such as N-methylated, N-ethylated or other N-arylated or alkylated compounds of melamine, ammeline or ammelide, any of which have been chlorinated to form products containing active chlorine, may be combined with the cyanuric acid derivative from which the chlorinated product is prepared. The reaction products thus obtained exhibit characteristics which are similar to those possessed by the melamine-chlorinated melamine mixtures.

Melamine is not the only compound which may be used with the chlorinated materials to achieve the desired results. I may use related derivatives of cyanuric acid which seem to have the property of combining with highly chlorinated compounds to yield stable aqueous alkaline solutions containing useful amounts of available chlorine. For example, ammeline, ammelide and dicyandiamide may be considered as equivalents of melamine in carrying out my invention.

Although the present invention has been described with particular reference to the specific details of certain embodiments thereof, it is not intended that such details shall be regarded as limitations upon the scope of the invention except insofar as included in the accompanying claims.

This application is a continuation of my copending application Serial No. 787,475 filed November 21, 1947.

I claim:

1. A composition of matter which comprises a stable aqueous alkaline solution containing (a) chlorinated melamine which has an available chlorine content in excess of 100 percent by weight, (b) melamine in amount sufficient to establish the active chlorine content of (a) and (b) at a concentration of 25 to 75 percent by weight of (a) and (b) and (c) an alkaline salt of an alkali metal and a weak inorganic acid selected from the group consisting of phosphoric, carbonic, bicarbonic, boric, and silicic acids; the available chlorine content of the solution being above 100 parts per million parts of solution.

2. A composition of matter consisting essentially of a mixture of (a) a chlorinated melamine having an available chlorine content in excess of 100 percent, (b) sufficient melamine to establish the available chlorine content at a concentration of 25 to 75 percent by weight based upon the total weight of melamine and chlorinated melamine, and (c) an alkaline salt of an alkali metal and a weak inorganic acid selected from the group consisting of phosphoric, carbonic, bicarbonic, boric and silicic acids.

3. A stable, substantially dry composition of matter which comprises (a) chlorinated melamine which has an available chlorine content in excess of 100 percent by weight and (b) melamine in amount sufficient to establish the active chlorine content of (a) and (b) at a concentration of 25 to 75 percent by weight of (a) and (b).

FRANKLIN STRAIN.

REFERENCES CITED

The following references are of record in the file of this patent:

UNITED STATES PATENTS

| Number | Name | Date |
|---|---|---|
| 2,184,883 | Muskat et al. | Dec. 26, 1939 |
| 2,184,886 | Muskat et al. | Dec. 26, 1939 |
| 2,184,888 | Muskat et al. | Dec. 26, 1939 |
| 2,430,233 | Magill | Nov. 4, 1947 |